United States Patent [19]

Inoue

[11] 3,873,881

[45] Mar. 25, 1975

[54] LIGHT AXIS ADJUSTING SYSTEM FOR MOTOR VEHICLE

[75] Inventor: Naohiko Inoue, Yokohama, Japan

[73] Assignee: Nissan Motor Company, Yokohama, Japan

[22] Filed: Nov. 1, 1973

[21] Appl. No.: 411,894

[30] Foreign Application Priority Data
Nov. 2, 1972  Japan.............................. 47-126729
Mar. 2, 1973  Japan.............................. 48-25808

[52] U.S. Cl............... 315/82, 240/7.1 LJ, 240/62 R
[51] Int. Cl............................................. B60q 1/10
[58] Field of Search............... 240/7.1 R, 7.1 LJ, 57, 240/61.3, 61.4, 62 R; 315/76, 77, 80, 82

[56] References Cited
UNITED STATES PATENTS

| | | | |
|---|---|---|---|
| 3,177,355 | 4/1965 | Trowbridge .................... | 240/7.1 LJ |
| 3,336,470 | 8/1967 | Sombardier ..................... | 240/7.1 LJ |
| 3,634,677 | 1/1972 | Wollfing-Seelig et al. ..... | 240/7.1 LJ |
| 3,638,069 | 1/1972 | Baker................................... | 315/82 |

*Primary Examiner*—Rudolph V. Rolinec
*Assistant Examiner*—E. R. LaRoche

[57]  ABSTRACT

A head lamp light axis adjusting system for a motor vehicle, which comprises an actuator for actuating the light units of the head lamps when energized so as to adjust the direction of the light axes of the head lamps, a position detector for producing a position voltage signal with a voltage according to the position of the light units, a distance detector for producing a distance signal with a voltage according to distance between the chassis and the wheel shaft, when energized, a detector controller for energizing the distance detector when the hand brake is actuated during the night time and for de-energizing the distance detector when the distance detector completes its detection operation, and actuator energizing means for energizing the actuator in accordance with the position and distance voltage signals when the distance detector is de-energized.

9 Claims, 4 Drawing Figures

LIGHT AXIS ADJUSTING SYSTEM FOR MOTOR VEHICLE

The present invention relates in general to a motor vehicle and in particular is concerned with a head lamp light axis adjusting system for adjusting direction of the light axis of the head lamp.

The conventional head lamp light axis adjusting system comprises a servo mechanism for positioning the light unit of the head lamp so as to adjust the light axis of the head lamp, a first detector for producing a first voltage signal representing the position of the light unit, a second detector for producing a second voltage signal representing distance between the chassis and the wheel shaft, and a controller for energizing the servo mechanism in accordance with the first and second voltage signals.

It has been a problem in the conventional system that since the servo mechanism includes a servo motor which is to be energized forwardly and reversely, the controller is inevitably complicated in construction and liable to be in trouble. Furthermore, the second detector is subject to erroneous operation and has low durability, since the second detector is arranged to operate continuously even during the cruising of the motor vehicle.

It is accordingly a principal object of the present invention to provide a new and improved head lamp light axis adjusting system which has a simplified structure and a high durability.

It is another object of the present invention to provide a head lamp light axis adjusting system which operates only when the hand brake of the motor vehicle is actuated.

It is a further object of the present invention to provide a head lamp axis adjusting system which can correctly operate even when the accelerator pedal is depressed during the time period when the hand brake is actuated.

It is a still further object of the present invention to provide a head lamp axis adjusting system which can avoid erroneous operation even if the hand brake is actuated during too short interval to detect the distance between the chassis and the wheel shaft.

According to the present invention, it has been found that the above objects are achieved by a head lamp light axis adjusting system comprising an actuator mechanically connected with the light unit of the head lamp for actuating the light unit when energized so as to adjust the direction of the light axis of the head lamp, first detecting means for producing a first voltage signal having a voltage according to the position of the light unit of the head lamp, second detecting means for producing a second voltage signal having a voltage according to the distance between the chassis and one of the wheel shafts when energized, detector control means connected to the second detecting means for energizing the second detecting means when the hand brake is actuated during the night time and for de-energizing the second detecting means when said second detecting means completes the detection operation thereof, and actuator energizing means electrically connected to said actuator and said detector control means for energizing the actuator in accordance with the first and second voltage signals when the second detecting means is de-energized.

For a full understanding of the present invention, a detailed description in a preferred form will now given in connection with the accompanying drawings and the features forming the invention will be specifically pointed out in the appended claims.

IN THE DRAWINGS

Figure 2:
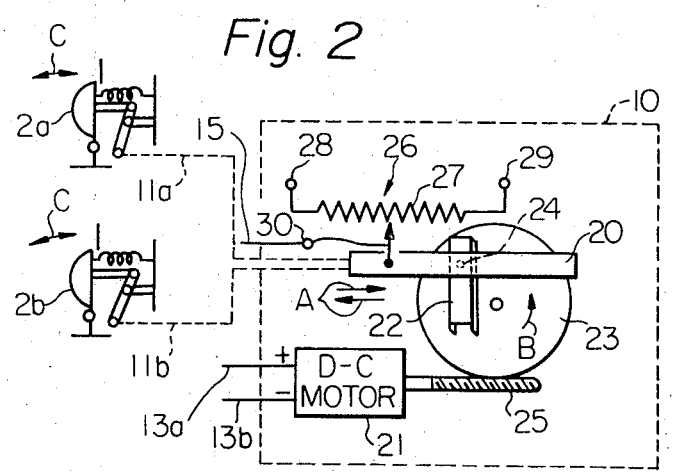
FIG. 2 is a diagram illustrating a light unit actuator according to the present invention and a light unit position detector incorporated in the light unit actuator, for detecting the position of the light unit.
Figure 3:
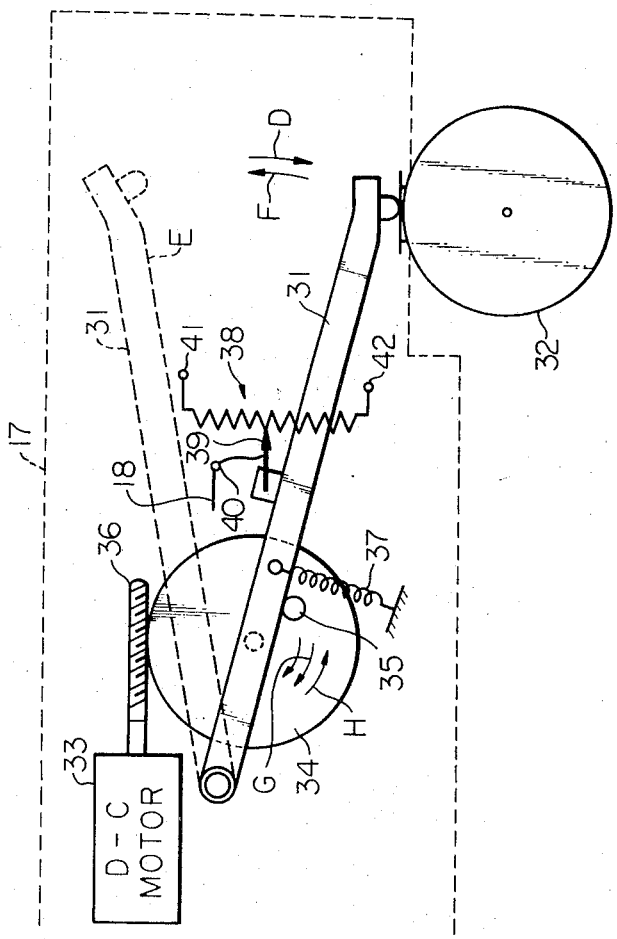
Figure 4:
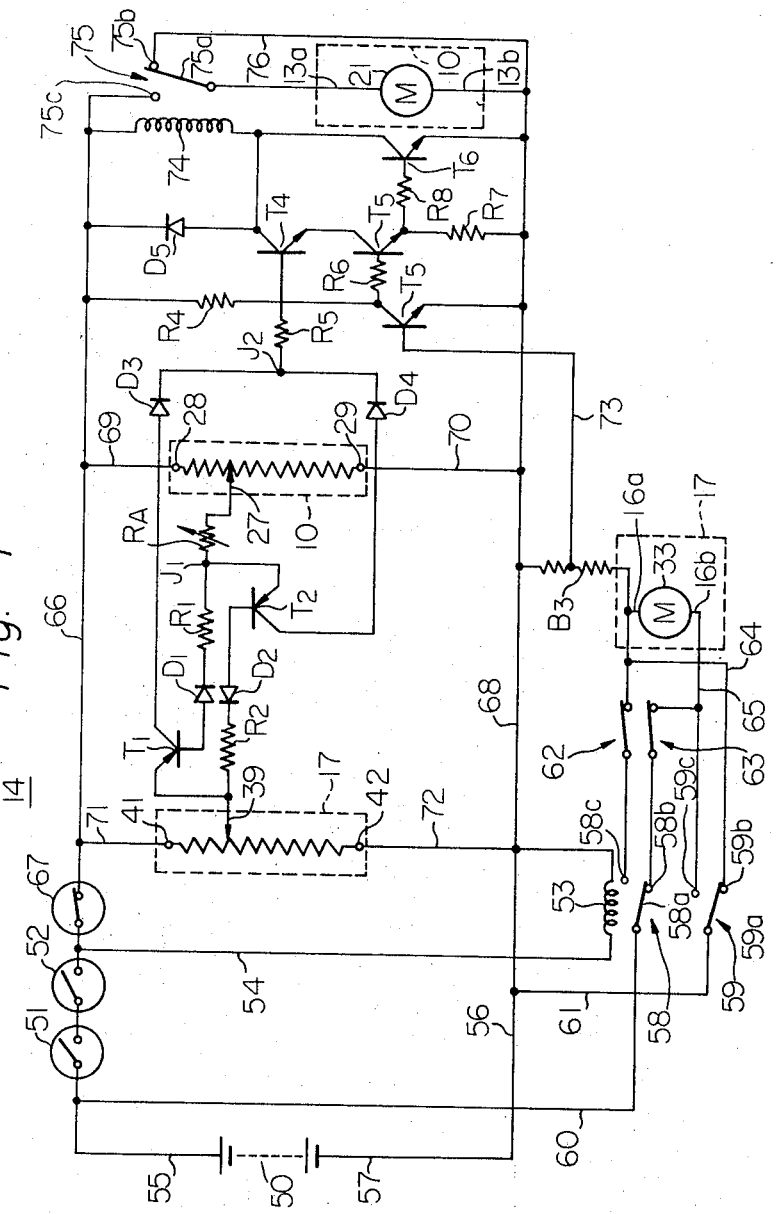

FIG. 3 is a diagram illustrating a distance detector according to the present invention, for detecting the distance between the chassis and one of the wheel shafts; and FIG. 4 is a diagram showing a circuit arrangement according to the present invention, for controlling the actuator in accordance with output signals from the light unit position detector and distance detector shown in FIGS. 2 and 3.

Figure 1:
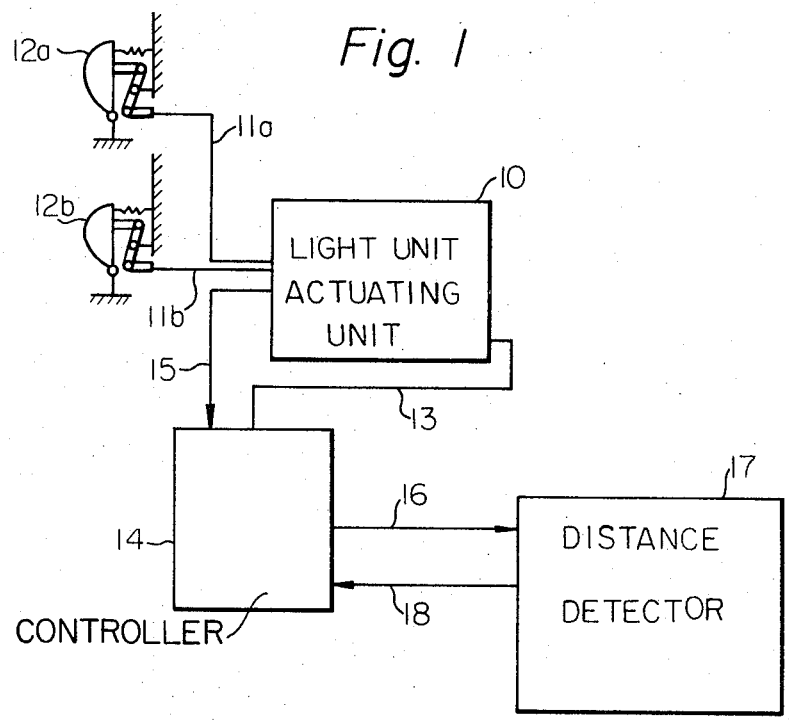
FIG. 1 is a schematic block diagram showing a head lamp light axis adjusting system according to the present invention.

Referring now to the drawings and more specifically to FIG. 1 thereof, there is shown a head lamp light axis adjusting system according to the present invention, which comprises a light unit actuating unit 10 including a light unit actuator for actuating the light unit so as to adjust the light axis of the head lamp and a light unit position detector for detecting the position of the light unit and for producing a position voltage signal representing the position of the light unit. The light unit actuator is, in this case, mechanically connected by means of a pair of flexible wires 11a and 11b to a pair of mechanical linkages respectively connected to light units 12a and 12b of head lamps. Each of the light units 12a and 12b is, for example, comprised of a lamp and a concave reflector carrying the lamp. The light unit actuator actuates the light units 12a and 12b through the flexible wires 11a and 11b in accordance with an actuation signal applied thereto through a line 13 from a controller 14. The position signal from the light unit position detector is, on the other hand, applied to the controller 14 through a line 15. The controller 14 produces an actuation signal which is applied through a line 16 to a distance detector 17. When receiving the actuation signal, the distance detector 17 operates to detect the distance between the chassis and one wheel shaft, for example, the rear wheel shaft and produces a distance signal representing that distance. The distance signal is applied through a line 18 to the controller 14. The controller 14 produces the actuation signal in accordance with the position signal from the position detector and the distance signal from the position detector 17. Although there is not clearly shown in this figure, the controller 14 observes the operation of the distance detector 17 and produces the actuation signal when the distance detector 17 completes its detecting operation.

In FIG. 2, there is illustrated, in detail, the light unit actuator unit 10 which includes a reciprocally movable rod 20 having its one end connected to the light units 12a and 12b by way of the flexible wires 11a and 11b, a first d-c motor 21, and a mechanical linkage connecting between the reciprocally movable rod 20 and the rotary shaft of the d-c motor 21 for making the reciprocally movable rod to reciprocally move as indicated by arrows A in accordance with the motion of the rotary shaft of the d-c motor 21. The mechanical linkage includes a guide member 22 fastened onto the reciprocally movable rod 20 in generally perpendicular relationship with respect to the reciprocally movable rod 20. The guide member 22 has a guide groove longitudinally extending therethrough. A worm gear 23 is adapted to be rotatable about an axis substantially perpendicular to both of the moving direction of the reciprocally movable rod 20 and the direction of the guide groove of the guide member 22. A pin 24 is mounted on the side surface of the worm gear 23 in such a manner as to slidably couple with the guide groove of the guide member 22. A worm member 25 is mounted on the rotary shaft of the d-c motor 21 in alignment with the rotary shaft. The worm member 25 meshes with the worm gear 23 so as to form a worm gear drive. The position detector includes a potentiometer 26 with a slide contact 27 which is mounted on the reciprocally movable rod 20. The resistance of the potentiometer 26 has its ends electrically connected to input terminals 28 and 29 to which a power supply means (not shown) is connected. The slide contact 27 is electrically connected to the line 25. The d-c motor 21 has input terminals 13a and 13b which are represented by the line 13 in FIG. 1. When a d-c power, that is, the actuation signal is applied through the input terminals 13a and 13b to the electric motor 21, the worm gear 23 rotates in such a direction as indicated by an arrow B, so that the slide contact 27 reciprocally slides on the resistance of the potentiometer 26 and the light units 12a and 12b respectively pivotally moves in vertical planes as indicated by arrows C. The light axes of the head lamps move in vertical planes. Although the actuator unit 10 is explained hereinabove in the case of a pair of head lamps, the actuator unit 10 may be combined with only one head lamp in some cases.

In FIG. 3, there is shown, in detail, the distance detector 17 which includes a lever 31 vertically rotatable mounted at its one end on such a portion of the chassis that the other end of the lever 31 abuts on a wheel shaft 32 when the lever 31 downwardly moves as indicated by an arrow D from a home position as indicated by a broken lines E. The distance detector 17 further includes a d-c motor 33 having input terminals 16a and 16b which are represented by the line 16 in FIG. 1. The d-c motor 33 is energized by a d-c power, that is, the actuation signal applied to the input terminals 16a and 16b. A mechanical linkage is provided for connecting between the lever 31 and the rotary shaft of the d-c motor 33 for permitting the lever 31 to rotate in a vertical plane in accordance with the motion of the rotary shaft of the d-c motor 33. The mechanical linkage includes a worm gear 34 adapted to be rotatable in a vertical plane, a pin 35 mounted on the side surface of the worm gear 34 in such a manner as to support the lever 31, and a worm member 36 mounted on the rotary shaft of the d-c motor 33 in alignment with the rotary shaft and meshed with the worm gear 34 so as to form a worm gear drive. A spring 37 is provided having one end thereof connected to the chassis and the other end thereof connected to an intermediate portion of the lever 31 so as to downwardly urge the lever 31. A potentiometer 38 is provided having a slide contact 39 mounted on an intermediate portion of the lever 31. The slide contact 39 is, on the other hand, electrically connected through a terminal 40 to the line 18. To both the terminals 41 and 42 of the resistance of the potentiometer 38 is connected a power supply means (not shown) which may be the same one as is connected to the potentiometer 26 of the position detector 10, if desired.

When, in operation, the d-c motor 33 is forwardly energized, the rotary shaft of the motor 33 forwardly rotates so that the worm gear 34 rotates as indicated by an arrow G and accordingly the lever 31 moves in the direction D until the lever 31 abuts on the wheel shaft 32. When, on the contrary, the d-c motor 33 is reversely energized, the worm gear 34 rotates in a direction as indicated by an arrow H so that the lever 31 moves in a direction as indicated by an arrow F until the lever 31 takes the home position. The slide contact 39 slides on the resistance of the potentiometer 38 in accordance with the movement of the lever 31 with the result that a voltage signal appears on the slide contact 39 representing the distance between the chassis and the wheel shaft 32.

In FIG. 4, there is shown a circuit arrangement of the controler 14, which comprises a distance detector control circuit consisting of a d-c power source 50 which may be a usual storage battery installed in the motor vehicle, a side marker lamp switch 51 adapted to close only when the side marker lamp is energized during the nighttime, a hand brake switch 52 adapted to close only when the hand brake is actuated and connected to the side marker lamp switch 51 in series with each other. A relay coil 53 having its one terminal connected through a line 54 and the series connection of the switches 51 and 52 to a positive terminal 55 of the d-c power source 50. The other terminal of the relay coil 53 is connected through a line 56 to a negative terminal 57 of the power source 50. With the relay coil 53 are associated a pair of change-over relay switches 58 and 59 which respectively have movable contacts 58a and 59a respectively connected through lines 60 and 61 to the positive and negative terminals 55 and 57 of the power source 50. The relay switch 58 has a break contact 58b and a make contact 58c and the relay switch 59 has a break contact 59b and a make contact 59c. A first normally-closed motor stop switch 62 is provided which is so associated with the mechanical linkage of the distance detector 17 as to open its circuit when the worm gear 34 forwardly rotates through a predetermined angle enough to permit the lever 31 to abut on the wheel shaft 32. A second normally-closed motor stop switch 63 is so associated with the mechanical linkage as to open its circuit when the worm gear 34 rotates reversely through a predetermined angle enough to permit the lever 31 to take the home position. The motor stop switch 62 connects the make contact 58c and the input terminal 16a of the d-c motor 33 and, on the other hand, the motor stop switch 63 connects between the break contact 58b and the input terminal 16b of the d-c motor 33. The break and make contacts 59b and 59c are respectively connected through lines 64 and 65 to the input terminals 16a and 16b of the motor 33. The circuit arrangement of FIG. 4 further comprises an actuator energizing circuit which includes a positive bus line 66 connected through an accelerator pedal depression switch 67 and through the series connection of the side marker lamp 51 and the hand brake switch 52 to the positive terminal 55 of the d-c power source 50. The accelerator pedal depression switch 67 is normally closed and adapted to open when the accelerator pedal is depressed. A negative bus line 68 is connected through the line 56 to the negative terminal 57 of the power source 50. It will be now understood that another power source and switches having the same functions as those switches 51, 52 and 67 may be used for supplying d-c power source across the bus lines 66 and 68, if preferred. The positive and negative bus lines 66 and 68 are respectively connected through lines 69 and 70 to the input terminals of the light unit actuator unit 10 so as to build at the slide contact 27 a voltage, that is the position signal, representing the position of the light units 12a and 12b of the head lamps. The positive and negative bus lines 66 and 68 are respectively connected through lines 71 and 72 to the input terminals 41 and 42 of the distance detector 17 so as to build at the slide contact 39 a voltage, that is the distance signal, representing the distance between the chassis and the wheel shaft. The actuator energizing circuit further includes a comparator circuit for comparing the position and distance signals so as to produce a drive signal until difference between the voltages of the position and distance signals becomes substantially equal to a predetermined level. The comparator circuit includes a transistor $T_1$ of PNP type the emitter of which is connected direct to the slide contact 39. The base of the transistor $T_1$ is connected to the anode of a diode $D_1$ the cathode of which is connected through a resistor $R_1$ to one terminal of an adjustable resistor $R_4$. The other terminal of the adjustable resistor $R_4$ is connected direct to the slide contact 27. A transistor $T_2$ of PNP type has its emitter connected to the one terminal of the adjustable resistor $R_4$ to form a junction $J_1$ and its emitter connected to the anode of a diode $D_2$. The cathode of the diode $D_2$ is connected through a resistor $R_2$ to the slide contact 39. A pair of diodes $D_3$ and $D_4$ respectively have their anodes connected to the collectors of the transistors $T_1$ and $T_2$. The cathodes of the diodes $D_3$ and $D_4$ are connected with each other to form a junction $J_2$. The actuator energizing circuit further includes an observing circuit including a resistor $R_3$ having its one terminal connected to the negative bus line 68 and the other terminal connected to the input terminal 16a of the d-c motor 33, and a transistor $T_3$ the base of which is connected through a line 73 to an intermediate point of the resistor $R_3$. The emitter of the transistor $T_3$ is connected to the negative bus line 68. The collector of the transistor $T_3$ is connected through a resistor $R_4$ to the positive bus line 66. The actuator energizing circuit further includes a motor actuating circuit generally including three transistors $T_4$, $T_5$ and $T_6$, and a relay coil 74. The transistor $T_4$ has its base connected through a resistor $R_5$ to the joint $J_2$ and its emitter connected to the collector of the transsistor $T_5$. The base of the transistor $T_5$ is connected through a resistor $R_6$ to the collector of the transistor $T_3$. The emitter of the transistor $T_5$ is connected through a resistor $R_7$ to the negative bus line 68 and through a resistor $R_8$ to the base of the transistor $T_6$. The transistor $T_6$ has its emitter connected direct to the negative bus line 68 and its collector connected to one terminal of the relay coil 74 and also to the collector of the transistor $T_4$. The transistor $T_6$ therefore serves as a driver for the relay coil 74. The transistors $T_4$ and $T_5$ cooperate to form an AND gate. The other terminal of the relay coil 74 is connected to the positive bus line 66. The relay coil 74 is bypassed by a diode $D_5$ which allows a current to flow therethrough when the transistor $T_6$ becomes non-conductive, so that not only the transistor $T_6$ but also the transistors $T_4$ and $T_5$ are protected from being damaged due to an electro-motive force generated in the relay coil 74. It will be now understood that the collector of the transistor $T_4$ may be connected direct to the positive bus line 66, if desired. A change-over switch 75 has a movable contact 75a, a break contact 75b and a make contact 75c and so associated with the relay coil 74 as to actuate when the relay coil 74 is energized. The movable contact 75a is connected to the input terminal 13a of the d-c motor 21 of the actuator unit 10. The input terminal 13b of the motor 21 is connected direct to the negative bus line 68. The break contact 75b is connected through a line 76 to the negative bus line 68 and the make contact 75c is connected direct to the positive bus line 66.

The operation of the head lump light axis adjusting system of the invention will now be explained hereinbelow in connection with FIGS. 2, 3 and 4.

When neither the side marker lamp switch 51 nor the hand brake switch 52 is actuated, the circuit of FIG. 4 is non-operative and accordingly overall system of the invention is non-operative, so that the system of the invention does not operate unnecessarily. Since, in this instance, the relay coil 53 is not energized and the relay switches 58 and 59 are not actuated, the motor 33 of the distance detector 17 is reversely energized by the electric power supplied thereto through the break contacts 58b and 59b of the relay switches 58 and 59. When the motor 33 is reversely energized, the worm gear 34 rotates in the direction H so that the lever 31 moves up toward the home position. When the worm gear 34 rotates through an angle enough to permit the level 31 to restore the home position, the motor stop switch 63 is actuated to open with the result that the motor 33 is de-energized.

When both the side marker lamp switch 51 and the hand brake switch 52 are actuated, the relay coil 53 is energized, the movable contacts 58a and 59a of the switches 58 and 59 move thereby to contact with the make contacts 58c and 59c, respectively, so that the motor 33 is forwardly energized by the power from the power source 50 supplied thereto by way of the make contacts 58c and 59c. Thus, the worm gear 34 rotates in the direction G so that the lever 31 moves in the direction D until the end portion of the lever 31 abuts on the wheel shaft 32. When the worm gear 34 rotates the predetermined angle, the motor stop switch 62 is actuated whereby the motor 33 is deenergized. When, the motor stop switch 62 is actuated, a voltage appearing on the line 73 is extinguished, so that the transistor $T_3$ become non-conductive, whereby a positive voltage, that is, the detection completion signal appears at the collector of the transistor $T_3$. As long as, on the other hand, the accelerator pedal is not depressed, the potentiometers 26 and 38 of the position and distance detectors 10 and 17 are energized so that the position and distance voltage signals appear on the slide contacts 27 and 39, respectively. When difference between the position and distance signals is larger than the predetermined voltage, a voltage across the junction $J_1$ and the slide contact 39 renders either one of the transistors $T_1$ and $T_2$ conductive, so that the transistors $T_4$ and $T_5$ simultaneously become conductive since, in this instance, the detection completion signal is also applied to the base of the transistor $T_5$. Accordingly, the transistor $T_6$ becomes conductive thereby to energize the relay coil 74. When the relay coil 74 is energized, the movable contact 75a contacts with the make contact 75c, so that the motor 21 is energized. While the motor 21 is energized, the light units 12a and 12b respectively pivot and the slide contact 27 slide on the resistance and accordingly the position voltage signal varies in voltage in accordance with the position of the slide contact 27. When the difference between the position signal and the distance signal lowers the predetermined voltage, both of the transistors $T_1$ and $T_2$ are rendered non-conductive, so that the transistors $T_4$ and $T_5$ also become non-conductive. The transistor $T_6$ becomes non-conductive and the relay coil 74 is de-energized, so that the relay switch 75 restores thereby to short-circuit between the input terminals 13a and 13b. The motor 21 then quickly stops due to the "dynamic braking." The light axes of the head lamps are adjusted in accordance with the distance between the chassis and the wheel shaft through the operation of the system as above-mentioned.

As is well known, the vehicle body moves up and down when the accelerator pedal is depressed while the hand brake is actuated. Since the accelerator pedal depression switch 67 cuts off the positive bus line 66 from the power source 50, the system of the invention is not affected by the movement of the vehicle body due to the above-mentioned state. Since, further, the system of the invention actuates the light units after the distance detector 17 completes its operation, the system does not erroneously operate even if the hand brake is actuated during so short a time that the distance detector 17 cannot complete its detection operation.

It will be understood that since the actuator unit 10 of the system according to the invention is so arranged as to be capable of adjusting the light axes of the head lamp by energizing the motor 21 in only one direction, the circuit arrangement of the controller 14 is much simpler than the prior art system.

The detailed description of the preferred embodiment of the invention for the purpose of explaining the principles thereof is not to be considered as limiting or restricting the invention, as many modifications may be made by the exercise of skill in the art without departing from the spirit and scope of the invention.

What is claimed is:

1. A system for adjusting direction of the light axis of the head lamp of a motor vehicle, which comprises:
    an actuator for moving the light axis of the head lamp when it is energized, said actuator including a reciprocally movable rod mechanically connected to the light unit of the head lamp, a first d-c electric motor, and a mechanical linkage connected between said reciprocally movable rod and the rotary shaft of said motor for making said reciprocally movable rod move in accordance with the motion of said motor;
    first detecting means for producing a first voltage signal having a voltage according to the tilt of the head lamp, said first detecting means including a first potentiometer having the slide contact thereof mechanically connected to said reciprocally movable rod, and a power supplying means connected to said first potentiometer for supplying a d-c power to said first potentiometer so as to build said first voltage signal at the slide contact, said power supplying means including a d-c power source, a first power line connecting between one output terminal of said power source and one terminal of said first potentiometer, a side marker lamp switch adapted to close when the side marker lamp is energized, a hand brake switch adapted to close when a hand brake of the vehicle is actuated and serially connected to said side marker lamp switch, an accelerator pedal depression switch adapted to open when an accelerator pedal of the vehicle is depressed and serially connected to said hand brake switch, and a second power line connecting through the series connection of said side marker lamp, hand brake and accelerator pedal depression switches between the other output terminal of said power source and the other terminal of said first potentiometer;
    second detecting means for producing a second voltage signal having a voltage according to distance between the vehicle chassis and one of the wheel shafts of the vehicle, when energized;
    detector control means connected to said second detecting means for energizing said second detecting means when the hand brake is actuated and for de-energizing said second detecting means when it completes its detecting operation; and
    actuator energizing means electrically connected to said actuator and said detector control means, for energizing said actuator in accordance with said first and second voltage signals when said second detecting means is de-energized.

2. A system as set forth in claim 1, in which said mechanical linkage includes a guide member fastened to said reciprocally movable rod in generally perpendicular relationship with respect to said reciprocally movable rod, a worm gear adapted to be rotatable about an axis substantially perpendicular to the moving direction of said reciprocally movable rod, a pin mounted on the side surface of said worm gear and slidably coupling with said guide member, a worm member mounted on the rotary shaft of said first electric motor and meshed with said worm gear so as to form a worm gear drive.

3. A system as set forth in claim 1, in which said second detecting means includes a lever vertically rotatavely mounted at one end portion thereof on such a portion of the chassis that the other end portion of said lever abuts on said one of the wheel shaft when said lever downwardly moves, a second electric motor, a second mechanical linkage connecting between said lever and the rotary shaft of said second electric motor for making said lever to vertically rotate in accordance with the motion of the rotary shaft of said second electric motor, and a second potentiometer having the slide contact thereof mechanically connected to said lever, the two terminals of said second potentiometer being connected to said power supplying means so as to build said second voltage signal.

4. A system as set forth in claim 3, in which said mechanical linkage includes a worm gear adapted to be rotatable in a vertical plane, a pin mounted on the side surface of said worm gear in such a manner as to be engage with said lever, and a worm member mounted on the rotary shaft of said second electric motor and meshed with said worm gear so as to form a worm gear drive.

5. A system as set forth in claim 3, in which said detector control means includes a d-c power source, side marker lamp switch adapted to close when the side marker lamp is energized, a hand brake switch adapted to close when the hand brake is actuated, said hand brake switch being connected to said side marker lamp switch in series with each other, a relay coil having one terminal thereof connected through the series connection of said side marker lamp switch and hand brake switch to one terminal of said power source and the other terminal thereof connected to the other terminal of said power source, a motor stop switch adapted to open when the rotary shaft of said second d-c electric motor rotates through a predetermined angle, and a pair of relay switches so associated with said relay coil as to close when said relay coil is energized, one of said relay switches connecting one terminal of said power source through said motor stop switch to one input terminal of said second d-c electric motor and the other of said relay switches connecting the other input terminal of said second d-c electric motor to the other terminal of said power source.

6. A system as set forth in claim 5, in which said actuator energizing means includes comparing means connected to the slide contacts of said first and second potentiometers for producing a drive signal until difference between the voltages of said first and second voltage signals becomes equal to a predetermined voltage, an observing means connected to said one input terminal or said second d-c electric motor for producing a detection completion signal when said second d-c electric motor is de-energized, and motor actuating means connected to said observing means and said comparating means, for energizing said first d-c electric motor when receiving both of said drive signal and said detection completion signal.

7. A system as set forth in claim 6, in which said comparating means includes first and second transistors, biasing means connected to the slide contacts of said first and second potentiometers for biasing across the base and emitter terminals of said first and second transistors in opposite directions by difference between said first and second voltage signal, a first rectifier having one terminal thereof connected to the collector terminal of said first transistor, and a second rectifier having one terminal thereof of the same kind as said one terminal of said first rectifier connected to the collector terminal of said transistor and the other terminal thereof connected to the other terminal of said first rectifier.

8. A system as set forth in claim 7, in which said observing means includes a resistor having one terminal thereof connected to said one input terminal of said second electric motor and the other terminal thereof connected to said other terminal of said power source, and a third transistor having the collector and emitter terminals thereof forwardly biased and the base terminal connected to an intermediate point of said resistor.

9. A system as set forth in claim 8, in which said motor actuating means includes an AND gate having one terminal thereof connected to the collector of said third transistor and the other input terminal thereof connected to a junction between said first and second diodes, a driver circuit having the input terminal thereof connected to the output terminal of said AND gate, and a relay circuit connected to said driver circuit for connecting said power source to the input terminals of said first electric motor.

* * * * *